United States Patent [19]

Markin

[11] Patent Number: 4,618,547

[45] Date of Patent: Oct. 21, 1986

[54] LEAK RESISTANT NON-TACKY SEALANT

[75] Inventor: Charles Markin, Toronto, Canada

[73] Assignee: Duracell Inc., Bethel, Conn.

[21] Appl. No.: 539,453

[22] Filed: Oct. 6, 1983

[51] Int. Cl.⁴ ............................................. H01M 2/08
[52] U.S. Cl. .................................... 429/174; 429/185; 429/206
[58] Field of Search ................ 429/185, 174, 171–173, 429/184, 206, 218

[56] References Cited

U.S. PATENT DOCUMENTS

| | | | |
|---|---|---|---|
| 3,713,896 | 1/1973 | Feldhake | 429/174 |
| 3,922,178 | 11/1975 | Winger | 429/167 X |
| 4,256,815 | 3/1981 | Smilanich et al. | 429/185 |
| 4,282,293 | 8/1981 | van Lier | 429/185 |

*Primary Examiner*—Anthony Skapars
*Attorney, Agent, or Firm*—Ronald S. Cornell

[57] ABSTRACT

A leak resistant non-tacky sealant for electrochemical cells which is particularly suited for high speed manufacturing processes comprised of a solvent castable, film forming, thermoplastic material with a polymeric binder which is in the liquid state at room temperature. The thermoplastic material and the liquid polymeric binder are mixed by dissolving both in a common solvent. The liquid polymeric binder is present in a maximum amount of 45% by weight of the sealant mixture.

9 Claims, No Drawings

LEAK RESISTANT NON-TACKY SEALANT

This invention relates to sealant materials for electrochemical cells and particularly to sealants for cells having alkaline electrolytes.

Commonly utilized cells or batteries such as those referred to as alkaline manganese dioxide, mercuric oxide, silver oxide and more recently lithium/manganese dioxide and the like have generally been packaged in cell containers which are sealed by means of a compression seal comprised of an insulative sealing or closure member such as a plastic or elastomeric gasket or grommet compressed between metal elements at the open end of the container. The gasket or grommet serves to seal the cell against electrolyte leakage and in many instances to electrically insulate the metal elements (usually the cell terminals) from each other. The closure members, since they are usually exposed to the elements contained within the cell are required to be substantially inert to such elements. As a result it has been preferred to utilize plastic e.g. nylon, polyethylene, polysulfone, and other generally inert materials for such members. In many cases, however the aforementioned materials have shortcomings such as cold flow under temperature cycling and imperfections in the surface area thereof. The metallic surface areas in contact therewith generally have imperfections as well. Thus, a cell electrolyte such as the common alkaline KOH utilized in many commercial cells (an aggressive leaking material) may leak, over a period of time, through such imperfections. Such leakage is in fact exacerbated by the hydrogen gas evolution common in alkaline cells which tends to push the electrolyte through the path of least resistance, i.e. the seal.

In order to prevent such leakage from occurring or at the very least to delay the inception thereof the sealing members or gasket are sometimes coated with a sealant material which flows into and fills the various leakage path imperfections of the sealing member and metal surfaces. Alternatively, the sealant material is applied as a bead around the outer peripheral edges of the sealing member and metal elements as an external leakage prevention barrier.

Button type cells which are generally utilized in sensitive equipment such as watches, hearing aids and cameras particularly require the extra leakage protection afforded by a sealant material in addition to the cell sealing structure. In the larger cylindrical cells the common practice has been to utilize a topically applied asphalt sealant whereas in the button type cell it has been the practice to completely coat the sealing member with sealant materials such as aliphatic or fatty polyamides. Another sealant material commonly utilized is substantially a viscous liquid comprising about 80% polyisobutene with a polyethylene filler which acts as a thickener. However, these commonly utilized sealants have certain drawbacks particularly in relation to automated procedures and the economical utilization thereof. The aliphatic or fatty polyamides are coated on sealing members such as grommets by means of a relatively expensive and complicated spraying procedure. Viscous liquid sealants while capable of being applied by a simplified dip coating method are however tacky which renders grommets coated therewith difficult to separate and handle properly and reliably particularly on an automated basis.

It is an object of the present invention to provide a polymeric non-tacky sealant having superior leak resistance properties and which can be easily and economically applied.

This and other objects, features and advantages of the present invention will become more evident from the following discussion.

Generally the present invention comprises a cell having a non-tacky sealant applied to a sealing member such as a grommet or gasket either by coating or by topical application. The sealant additionally provides superior leakage resistance as compared to the tacky sealants heretofore utilized. The non-tacky sealant of the present invention comprises a solvated mixture of a solvent castable film forming polymer such as a polyolefin and polymeric binder which is in the liquid state at room temperature. It is an important feature of the present invention that in excess of the liquid polymeric binder material should not be used. The binder material should be present in at least minimal (at least 5% by weight) and in minor amounts of preferably between 10-25% by weight. However, it should not exceed 45% by weight of the component mixture. This is in marked contrast to the previously utilized tacky sealants described above which were comprised of about 80% of the liquid component. In such prior art sealants the minimal amounts of polyethylene were added thereto in order to solidify the viscous liquid polyisobutene thereby preventing it from oozing away from the seal surfaces particularly under higher temperature conditions.

In the sealant of the present invention the thermoplastic, solvent castable, film forming material such as polyethylene comprises the actual sealant material. However, polyethylene alone forms a flaked, i.e. non-continuous (with bare spots) rather than a continuous film thereby rendering it unacceptable for use as a sealant. The addition of small amounts of polymeric viscous liquid material thereto in a solvated mixture serves to provide the requisite continuous film. Additionally, it has been discovered that the continuous film polymeric sealant of the present invention provides superior leak resistance when compared to the viscous liquid sealant of the prior art. This is in addition to the fact that the sealant of the present invention is non-tacky and therefore more easily and readily handled. Furthermore, the sealant of the present invention is superior to other prior art non-tacky sealants in that it can be readily applied by economical dip coating procedures.

The sealant of the present invention is made by dissolving the solvent castable film forming polymer and liquid polymeric binder in a common solvent. The solution is then placed on or adjacent the sealing member and is allowed to dry, i.e., the solvent is removed. A continuous film of the solute is formed thereby.

Both the liquid polymeric binder and the solvent castable film forming thermoplastic polymer such as polyolefin should have the characteristics of being compatible with one another, should be soluble in a single solvent and should be chemically resistant to the electrolyte such as KOH used in alkaline cells as well as other components. Since the viscous liquid component material functions as the binder it should preferably be flowable and adherent. It is preferred that the liquid binder material be in the light viscous state, in order to facilitate solvation and formation of the sealant solution.

An example of a typical polymeric material, which is a viscous liquid at room temperature, is polybutene and an example of a castable film forming thermoplastic polymer is polyethylene. These components are soluble in solvents such as 1,1,1 trichloroethane. The sealant film is readily formed by simple dipping of the gasket or grommet in the sealant solution. Removal of the solvent, such as by drying, results in a thin sealant film being formed over substantially the entire surface of the gasket or grommet. Since the sealant film is not tacky such relatively simple and inexpensive dipping procedure may be utilized without further need for special handling.

A specific example of the preferred polymer is Allied Chemical polyethylene grade #6 and specific examples of preferred liquid binder materials include polybutene #128 from the Chevron Corporation and Vistanex (a trademark for polybutene of the Exxon Corporation).

It is preferred, for safety considerations that chlorinated solvents be utilized such as 1,1,1 trichloroethane as well as dichloroethane, trichlorobutane, etc. However, other solvents meeting the above criteria may be utilized as well. In effecting the gasket or grommet coating procedure as described, the amount of the solvent utilized should be of sufficient amount such that a sealant film of less than 3 mils (0.007 cm) is formed on the gasket or grommet surface by simple dip coating and drying. However, the solvent should not be of an amount whereby concentration of the sealant solute is insufficient to form a substantially continuous film coating without "bare spots". For a 40 gm mixture of 1:3 polybutene to polyethylene between 400 to 1600 ml of 1,1,1 trichloroethane provides a useful solvent range.

Examples of other castable polymeric films in addition to polyethylene include acrylic, nylon, polypropylene and polyvinylchloride. Other room temperature liquid polymeric materials in addition to polybutene generally include polybutadiene resins, particularly carboxyl terminated polybutadiene and hydroxyl terminated polybutadiene, and the like.

Though the preferred method of application is as a continuous film over the surface of the gasket or grommet the sealant of the present invention may be topically applied to form a continuous closure element at the edge surfaces of the grommet and the metal members which form the compression seal.

In order to more fully illustrate the utilization and efficacy of the sealant of the present invention the following examples are presented with comparisons to cells sealed with prior art sealants. It is understood that such examples are for illustrative purposes only and that details cotained therein are not to be construed as being limitations on the present invention. Unless otherwise indicated all proportions throughout the specification and claims are by weight.

EXAMPLE 1

A non-tacky sealant material is made by dissolving 10 grams of Chevron polybutene #128 together with 30 grams of Allied Chemical polyethylene pellets grade #6 in 800 mls of 1,1,1 trichloroethane with heating to 65° C.–75° C. and constant stirring until a homogeneous solution is obtained. Cell sealing grommets are dip coated in the solution at room temperature and allowed to dry with a substantially continuous non-tacky 1 mil (0.025 mm) thick film being formed thereon. The coated grommets are utilized without special handling in sealing button cells each of the dimensions 5.33 mm height by 11.56 mm diameter and having zinc anodes, mercuric oxide cathodes and KOH electrolytes. The cells are tested for storage leakage with the results given in the Table below.

EXAMPLE 2

(PRIOR ART)

A tacky sealant material is made by dissolving 75 grams of Vistanex polybutene with 20 grams of polyethylene pellets grade #6 in about 1 liter of 1,1,1 trichloroethane with heating and stirring as in Example 1 until a homogeneous solution is obtained. Cell sealing grommets are dip coated in the solution at room temperature and are allowed to dry. A 1 mil (0.025 mm) thick tacky sealant material is formed on each grommet. The grommets are manually separated during such drying to prevent agglomeration. The grommets are also kept in a dust free environment and are individually manually handled with adhesion resistant gloves. The grommets are utilized to seal cells as above and are tested for storage leakage with the results given in the following Table:

TABLE

| EXAMPLE | STORAGE TIME & TEMPERATURE | # OF CELLS | LEAKAGE (detected at 3× magnification) |
|---|---|---|---|
| 1 | 6 months at 21° C. | 62 | 0 |
| 1 | 6 months at 55° C. | 20 | 0 |
| 2 (prior art) | 6 months at 21° C. | 200 | 4 |
| 2 (prior art) | 6 months at 55° C. | 20 | 3 |

It is evident from the above comparison that the non-tacky sealant of the present invention provides the primary advantage of facilitated handling in addition to improved leakage retardation when compared to the tacky sealant of the prior art. Furthermore, comparative cell discharge testing of cells made with the sealant of the present invention and those of the prior art provides almost identical results.

It is understood that the above examples are illustrative in nature in demonstrating the efficacy of the present invention. Accordingly, details contained therein are not to be construed as being limitations on the present invention. Changes in the component materials as well as relative proportions may be made and such sealants may be utilized in a wide variety of cell types and structures including larger cylindrical cells without departing from the scope of the present invention as defined in the following claims.

What is claimed is:

1. An electrochemical cell sealed with an insulative sealing member having a sealant material thereto characterized in that said sealant material is substantially non-tacky and is comprised of a solvent castable, film forming thermoplastic polymer selected from the group consisting of acrylic, nylon, polypropylene, polyethylene and polyvinylchloride; and a polymeric binder material, which is in the liquid state at room temperature, selected from the group consisting of polybutene, polyisobutene, polybutadiene resins, carboxyl terminated polybutadiene, and hydroxyl terminated butadiene, and wherein said liquid binder material comprises between 5–45% by weight of said sealant material.

2. The cell of claim 1 wherein said liquid binder material comprises between 10–25% by weight of said sealant material.

3. The cell of claim 1 wherein said film forming thermoplastic polymer is polyethylene.

4. The cell of claim 1 wherein said liquid binder material is polybutene.

5. The cell of claim 1 wherein said sealant material substantially coats said sealing member.

6. The cell of claim 5 wherein said cell is in the configuration of a button cell.

7. The cell of claim 6 wherein said cell is an alkaline cell containing a mercuric oxide cathode.

8. An electrochemical cell compressively sealed with an insulative sealing member substantially coated with a sealant material characterized in that said sealant material is substantially non-tacky and is comprised of polyethylene and polybutene wherein said polybutene is present in said sealant material in amounts between 5 to 45% by weight thereof.

9. The cell of claim 8 wherein said polybutene is present in amounts between 10 to 25% by weight thereof.

* * * * *